US012214323B2

(12) United States Patent
Cognon et al.

(10) Patent No.: US 12,214,323 B2
(45) Date of Patent: Feb. 4, 2025

(54) MULTI-COMPONENT MIXING DEVICE AND ASSOCIATED METHOD

(71) Applicant: EXEL INDUSTRIES, Epernay (FR)

(72) Inventors: Thibault Cognon, Paris (FR); Sébastien Jousselin, Paris (FR); Ludovic Demesy, Paris (FR)

(73) Assignee: EXEL INDUSTRIES, Epernay (FR)

( * ) Notice: Subject to any disclaimer, the term of this patent is extended or adjusted under 35 U.S.C. 154(b) by 656 days.

(21) Appl. No.: 17/412,199

(22) Filed: Aug. 25, 2021

(65) Prior Publication Data

US 2022/0062834 A1 Mar. 3, 2022

(30) Foreign Application Priority Data

Aug. 26, 2020 (FR) ........................................ 2008721

(51) Int. Cl.

| | |
|---|---|
| ***B05B 7/04*** | (2006.01) |
| ***B01F 25/20*** | (2022.01) |
| ***B01F 25/23*** | (2022.01) |
| ***B01F 25/315*** | (2022.01) |
| ***B05B 1/02*** | (2006.01) |
| *B01F 25/00* | (2022.01) |

(52) U.S. Cl.

CPC ............ *B01F 25/231* (2022.01); *B01F 25/28* (2022.01); *B01F 25/315* (2022.01); *B05B 1/02* (2013.01); *B05B 7/0408* (2013.01); *B01F 2025/9191* (2022.01); *B01F 2215/0409* (2013.01)

(58) Field of Classification Search

CPC ....... B05B 1/02; B05B 7/0408; B01F 25/231; B01F 25/315; B01F 25/28; B01F 2025/9191; B01F 2215/0409

USPC .............................................................. 239/8

See application file for complete search history.

(56) References Cited

U.S. PATENT DOCUMENTS

| | | | | | |
|---|---|---|---|---|---|
| 2,942,655 | A * | 6/1960 | Taylor | F23D 14/02 | 239/414 |
| 2,965,303 | A * | 12/1960 | Jackson | F23D 11/36 | 239/428 |
| 3,121,457 | A * | 2/1964 | Whipple | F23D 14/22 | 239/557 |

(Continued)

FOREIGN PATENT DOCUMENTS

| | | |
|---|---|---|
| EP | 0070487 A1 | 1/1983 |
| GB | 2036586 A | 7/1980 |

(Continued)

OTHER PUBLICATIONS

English translation of EP0070487 (Year: 1983).*

INPI Rapport de Recherche Preliminaire for Patent Application No. FR 2008721, May 14, 2021, 4 pp.

*Primary Examiner* — Chee-Chong Lee

(74) *Attorney, Agent, or Firm* — Soquel Group LLC

(57) ABSTRACT

A multi-component mixing device including at least a first supply of a first product and a second supply of a second product. The mixing device has a mixing chamber having at least a first inlet and a second inlet, the first supply opening into the mixing chamber at the first inlet and the second supply opening into the mixing chamber at the second inlet. The mixing device includes a nozzle arranged and adapted to inject the second product from the second supply into the mixing chamber as a flat jet. An associated mixing method is also provided.

14 Claims, 5 Drawing Sheets

(56) References Cited

U.S. PATENT DOCUMENTS

| | | | | |
|---|---|---|---|---|
| 3,360,201 | A * | 12/1967 | Popyk | F23D 11/406 239/428 |
| 3,873,023 | A * | 3/1975 | Moss | B05B 7/0408 239/3 |
| 4,012,904 | A * | 3/1977 | Nogle | F23R 3/34 60/737 |
| 4,081,958 | A * | 4/1978 | Schelp | F23R 3/40 431/170 |
| 4,116,383 | A * | 9/1978 | Johnson | B01F 25/45 239/557 |
| 4,278,418 | A * | 7/1981 | Strenkert | F23D 11/12 239/428 |
| 6,590,052 | B2 | 7/2003 | Atofina | |
| 2003/0224308 | A1 | 12/2003 | Ichikawa et al. | |

FOREIGN PATENT DOCUMENTS

| | | | |
|---|---|---|---|
| WO | 200118451 | A1 | 3/2001 |
| WO | 2011023302 | A1 | 3/2011 |

* cited by examiner

MULTI-COMPONENT MIXING DEVICE AND ASSOCIATED METHOD

CROSS-REFERENCE TO RELATED APPLICATION

This application claims priority of French Patent Application No. 20 08721, filed on Aug. 26, 2021.

FIELD OF THE INVENTION

The present invention relates to a multi-component mixing device including at least a first supply of a first product and a second supply of a second product, the mixing device having a mixing chamber having at least a first inlet and a second inlet, the first supply opening into the mixing chamber at the first inlet, the second supply opening into the mixing chamber at the second inlet.

The present invention further relates to an associated mixing method.

Such a mixing device is used to mix a base with a catalyst to form a coating product, for example, shortly before coating.

BACKGROUND OF THE INVENTION

Specific mixing devices exist, which include a mixing chamber that has a catalyst inlet and a product base inlet. The product base is fed into the mixing chamber as a flow, with the catalyst injected as a trickle.

However, the catalyst then forms a trickle in the flow of the base.

One possibility is to provide a mixing element(s), such as a propeller or a static mixer.

However, this makes the device more complex, and thus more difficult to maintain, specifically the cleaning thereof.

Moreover, a propeller or a static mixer are likely to have preferential flow paths, so that the mixture is not homogeneous at the outlet.

SUMMARY OF THE DESCRIPTION

An aim of embodiments of the invention is therefore to improve the mixing device to enable better mixing.

To this end, it is an object of embodiments of the invention to provide a mixing device of the aforementioned type, wherein the mixing device includes a nozzle arranged and adapted to inject the second product from the second supply into the mixing chamber as a flat jet, advantageously having a jet angle of between 50° and 80°.

Injecting the second product into the mixing chamber as a flat jet, into which the first product is introduced, allows for better distribution of the second product in the first product, and a better contact surface between the two products. The first product and the second product are homogeneously mixed at the outlet of the mixing chamber.

The device may further have one or more of the following features, considered individually or in any technically possible combination:

- the nozzle is arranged in the second supply, the nozzle including a downstream end arranged in the vicinity of the second inlet, more specifically at a distance strictly less than 5.0 mm, preferably 3.0 mm, more preferably 2.0 mm;
- the nozzle is arranged in the second supply, the nozzle including a downstream end, the distance between the first inlet and the downstream end, in a flow axis direction, being less than or equal to 10.0 mm;
- the second supply is adapted so that the second product has a pressure strictly higher than the pressure of the first product, more specifically by at least 1.0%;
- the nozzle delimits at least one passage, the or each passage comprising an ejection opening including, from upstream to downstream, a circular passage section directly followed by a slot, the circular passage section and the slot having an intersection, the intersection forming an ellipse;
- the mixing chamber has a flow axis, the nozzle being arranged to inject the second product about a central injection axis, the central injection axis being aligned with the flow axis;
- the mixing chamber has a flow axis, the first supply being adapted to introduce the first product into the mixing chamber along a central supply axis, the central supply axis and the flow axis defining an angle of between 0° and 135°, more specifically between 0° and 90°;
- the mixing chamber has a flow axis, the first supply being adapted to introduce the first product into the mixing chamber along a central supply axis, the central supply axis and the flow axis each defining a respective line, having a minimum distance from each other, referred to as an offset, between the central supply axis and the flow axis, the offset being non-zero, more specifically between 3% of the value of a mixing chamber radius and the value of the mixing chamber radius; and/or
- the mixing device includes an air supply, the mixing chamber having an air inlet, the air supply opening into the mixing chamber at the air inlet.

The invention further relates to a method for mixing at least a first product and a second product, including:

- providing a mixing device as described above,
- supplying the first product at the first inlet,
- supplying the second product to the second inlet, and
- injecting the second product into the first product in the mixing chamber through the flat jet nozzle advantageously having a jet angle of between 50° and 80°.

BRIEF DESCRIPTION OF THE DRAWINGS

Further features and advantages of the invention will become apparent from the following description of embodiments of the invention, given by way of example only and with reference to the drawings in which.

DETAILED DESCRIPTION

Figure 1:
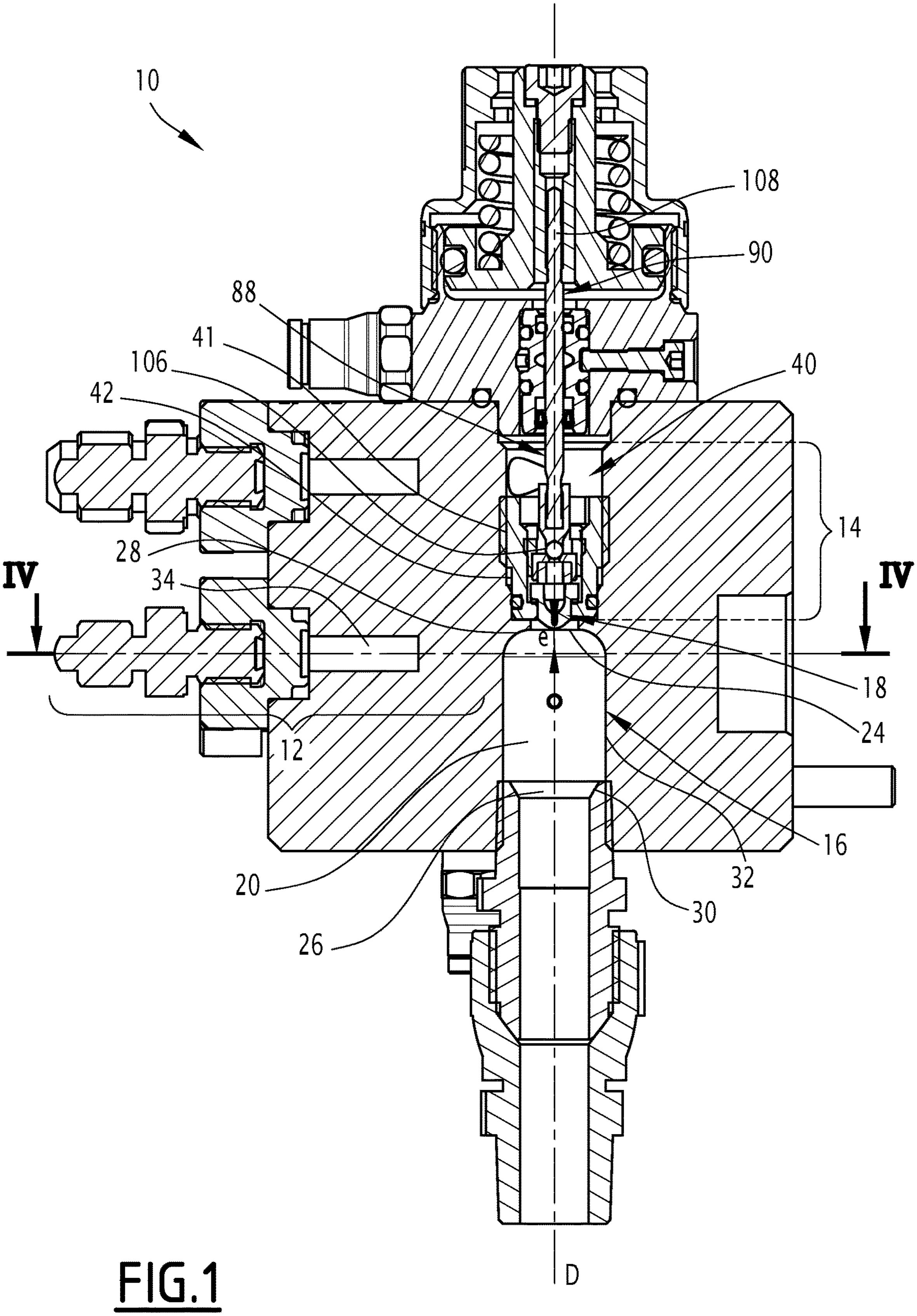
FIG. 1 is a front view showing a cross-section along a first sectional plane I-I of a device according to an embodiment of the invention.
Figure 2:
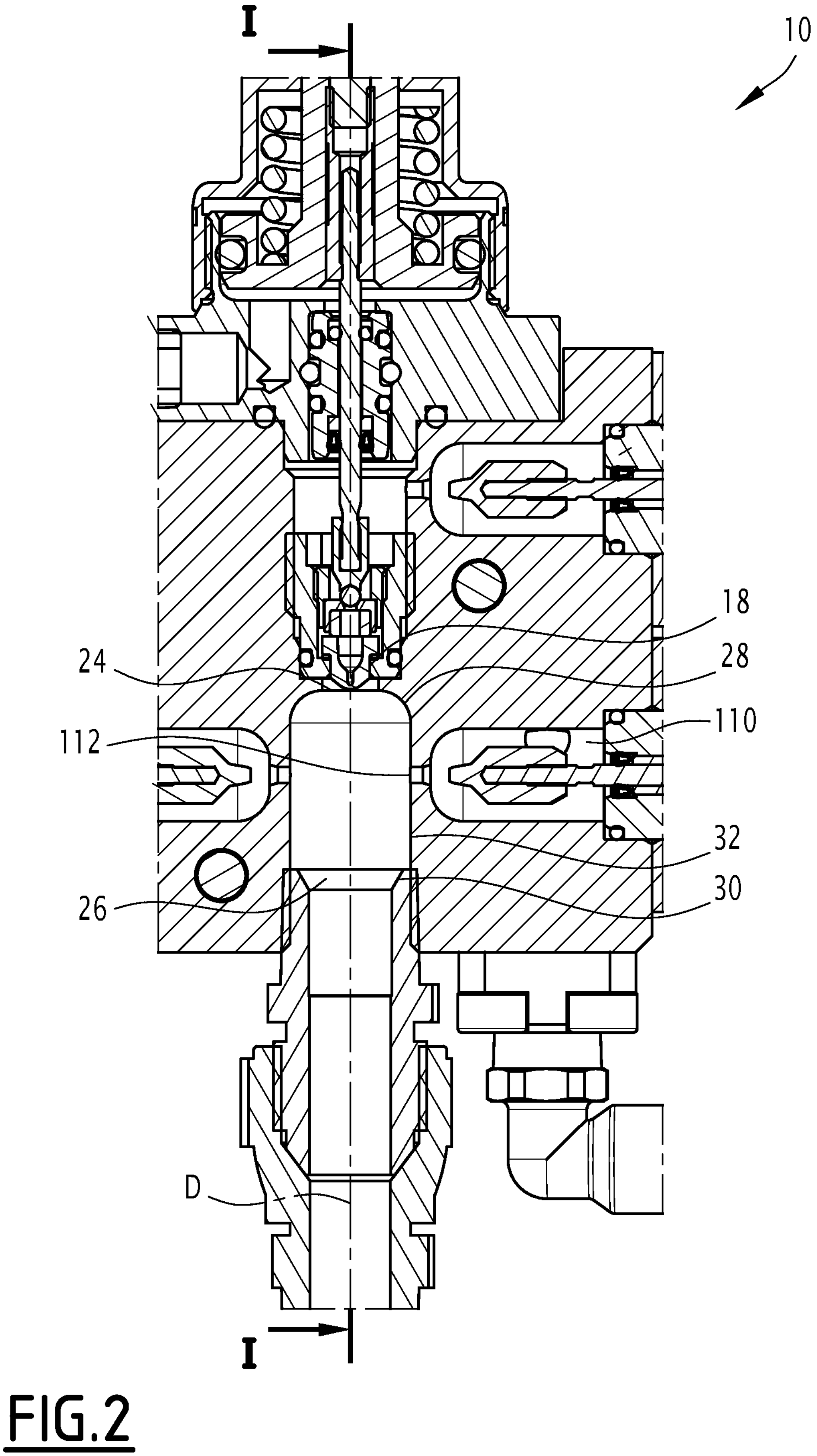
FIG. 2 is a side view showing a section according to a second sectional plane II-II of the device of FIG. 1.
Figure 3:
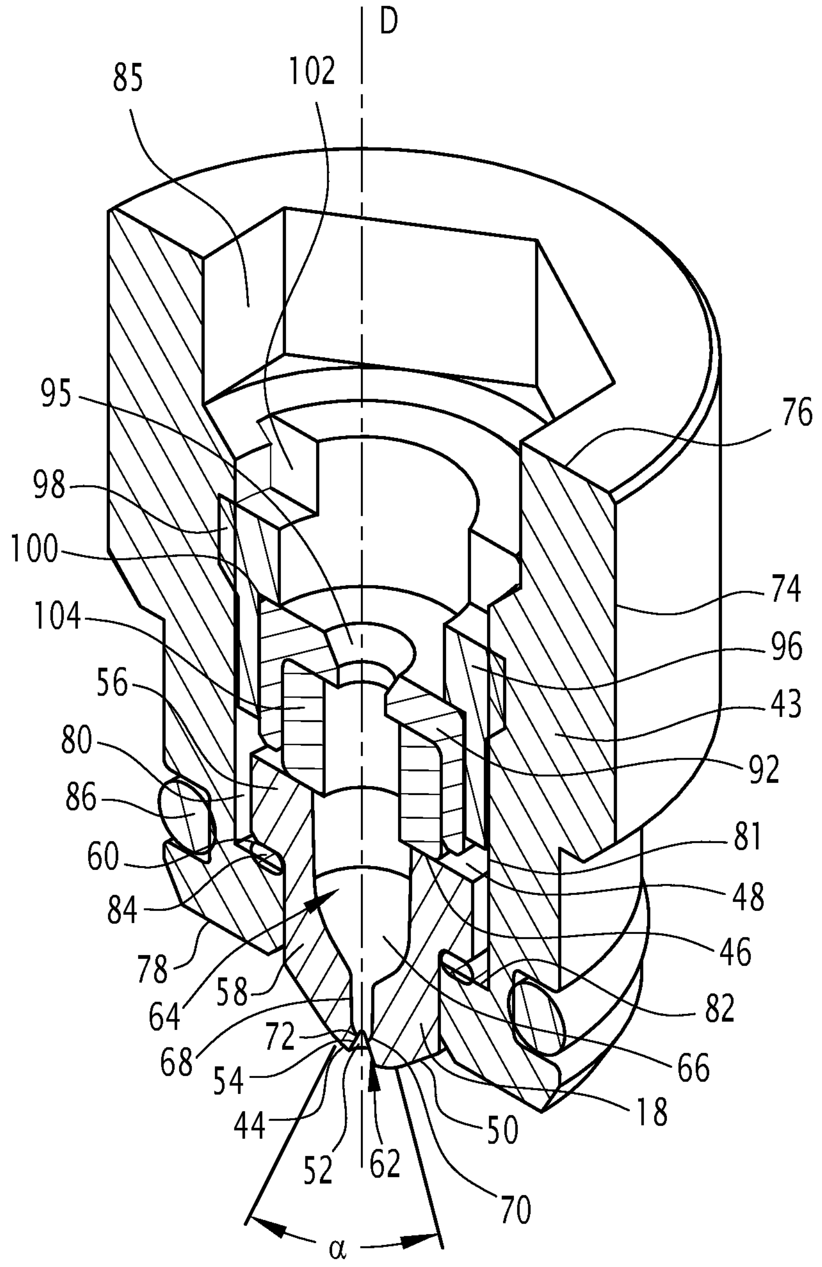
FIG. 3 is a perspective view showing a cross-section along a second sectional plane II-II of a portion of the device of FIG. 1.
Figure 4:
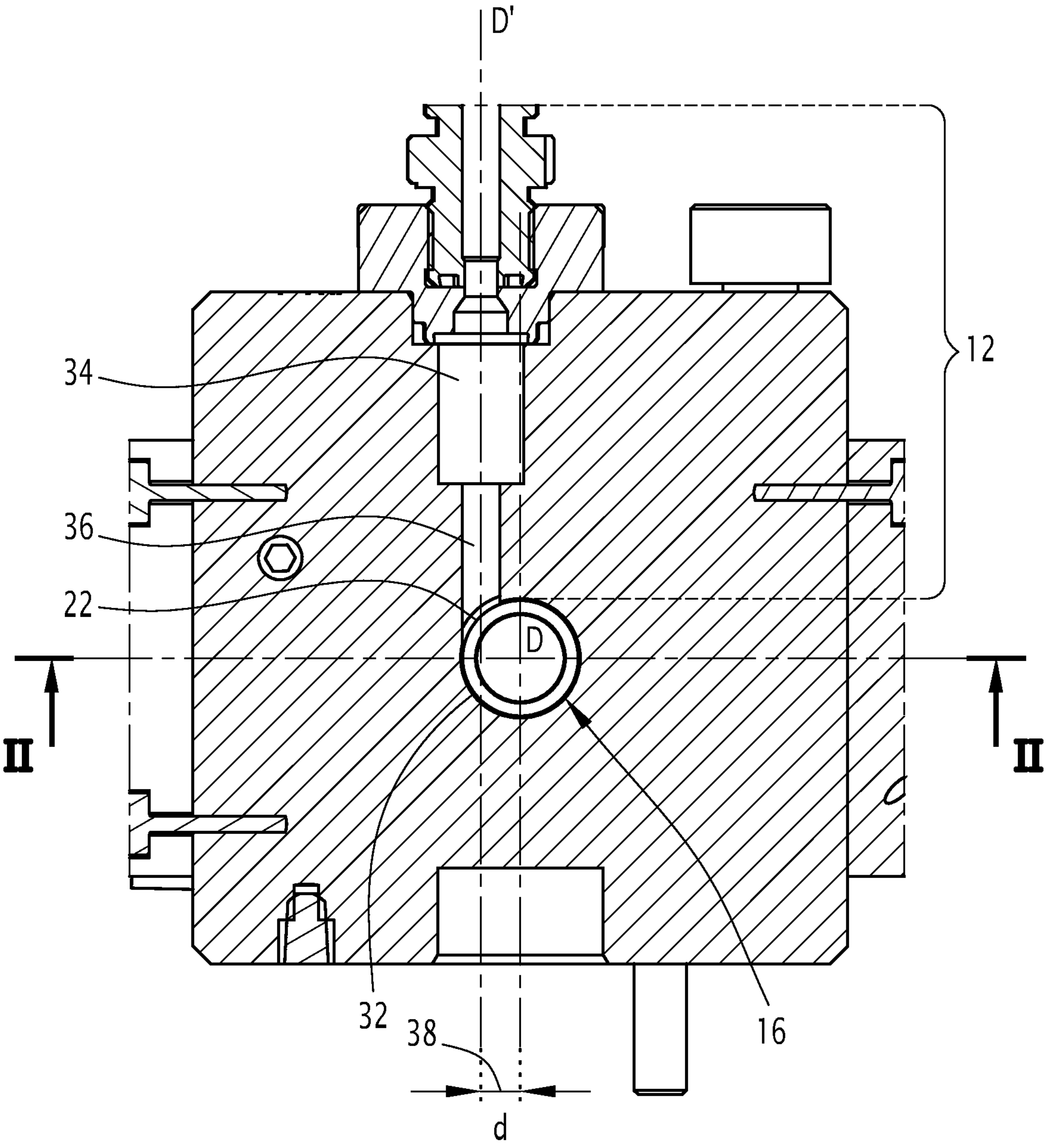
FIG. 4 is a top view showing a section along a third sectional plane IV-IV of the device of FIG.1.
Figure 5:
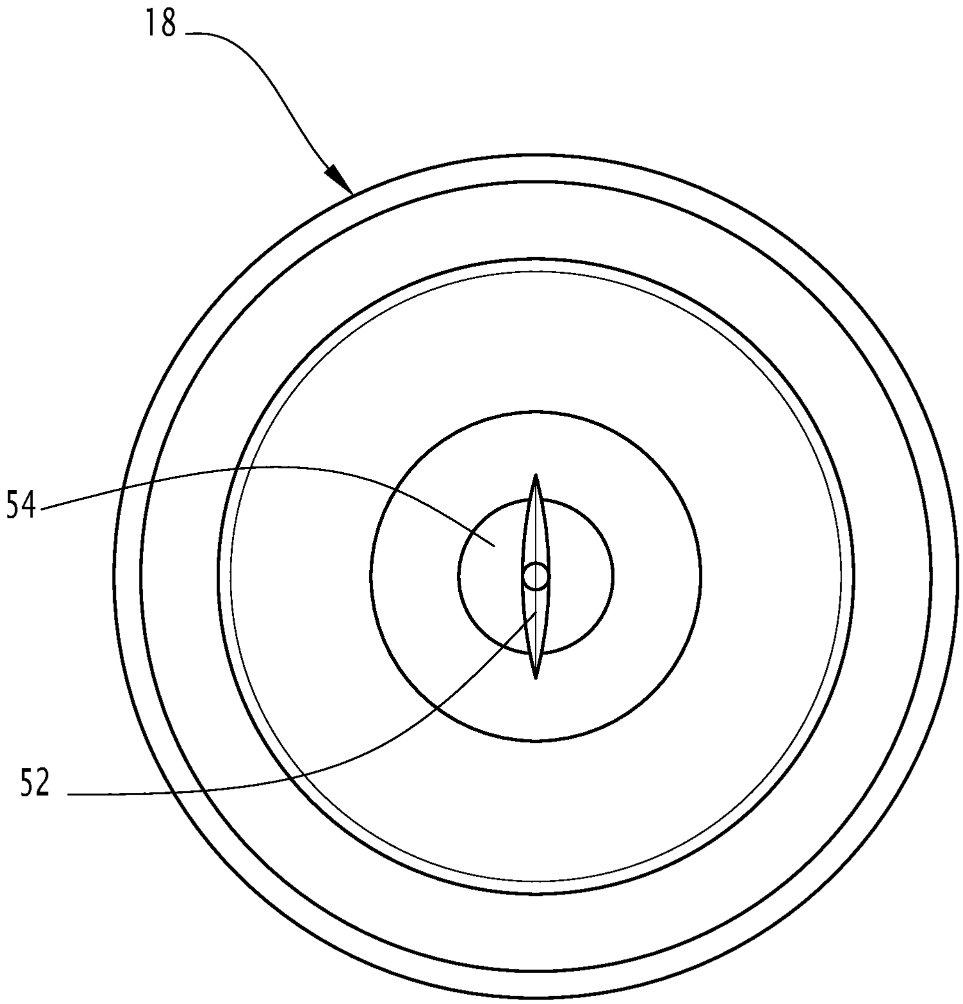
FIG. 5 is a front view of the nozzle of the device of FIG. 1.

An example of a multi-component mixing device 10 according to one embodiment of the invention is shown in FIGS. 1-5.

Mixing device 10 includes at least a first supply 12 of a first product, and a second supply 14 of a second product, a mixing chamber 16, and a nozzle 18.

A nozzle is understood as a means capable of making or letting pass a product of any viscosity, also called an injector or insert, such as a slotted nozzle as described below.

Mixing chamber 16 delimits a mixing space 20.

Mixing chamber 16 is made of stainless steel, for example.

Mixing chamber 16 has at least a first inlet 22 and a second inlet 24, and further, an outlet 26.

Mixing chamber 16 has a flow axis D.

Flow axis D is substantially vertical here. This specifically allows the flow to be facilitated by gravity.

Mixing chamber 16 extends between a first end and a second end along flow axis D.

The first end corresponds to an upper end 28 of mixing chamber 16.

The second end corresponds to a lower end 30 of mixing chamber 16.

In the illustrated example, mixing chamber 16 has substantially a hollow cylinder shape with flow axis D as the cylinder axis.

Mixing chamber 16 has a radius of 7.5 mm, for example.

Mixing chamber 16 includes a side wall 32 between upper end 28 and lower end 30.

First inlet 22 is delimited by side wall 32.

Side wall 32 is substantially cylindrical.

First inlet 22 has the shape of a disc projected onto side wall 32.

Second inlet 24 is arranged at upper end 28.

Second inlet 24 is centered on flow axis D.

Second inlet 24 has the shape of a disk.

Outlet 26 corresponds to lower end 30 of mixing chamber 16.

Outlet 26 is centered on flow axis D.

Outlet 26 has the shape of a disk.

First supply 12 opens into mixing chamber 16 at first inlet 22.

First supply 12 includes a first product source (not shown) and a first supply conduit 34.

First supply conduit 34 is made of stainless steel, for example.

First supply conduit 34 includes a first downstream portion 36, the first downstream portion 36 opening into mixing chamber 16, more specifically at first inlet 22.

In the illustrated example, first downstream portion 36 has a cylindrical shape.

First supply 12 is adapted to introduce the first product into mixing chamber 16 along a central supply axis D'.

Here, first downstream portion 36 extends primarily along central supply axis D'.

More specifically, first downstream portion 36 has central supply axis D' as its cylinder axis.

The respective directions of central supply axis D' and flow axis D form an angle between 0° and 135°, more specifically between 0° and 90°.

In the case of an angle of 0°, central supply axis D' and flow axis D are coincident. The first supply and the second supply are coaxial. More specifically, the first inlet extends around the second inlet. The first inlet has a ring shape, for example, and the second inlet has a disk shape surrounded by the inner diameter of the ring.

The selected angle specifically enables more or less turbulence or a flow closer to a laminar flow to be achieved.

In the example shown, central supply axis D' is orthogonal to flow axis D. Central supply axis D' extends in a plane perpendicular to flow axis D.

Central supply axis D' is horizontal, for example.

Central supply axis D' and flow axis D each define a respective straight line.

The straight lines defined by central supply axis D' and flow axis D do not intersect.

The straight lines have a minimum distance d from each other, corresponding to the distance between the straight lines.

The distance d is non-zero.

The non-zero distance d is referred to hereafter as an offset 38 between central supply axis D' and flow axis D.

The offset is substantial, i.e., not negligible, i.e., visible to the naked eye.

The offset is between 3% of the value of the mixing chamber radius and the value of the mixing chamber radius, more specifically between 10% of the value of the mixing chamber radius and the value of the mixing chamber radius.

More specifically herein, the offset is between 2.0 millimeters (mm) and 6.0 mm for a mixing chamber radius of 6.0 mm.

The offset specifically allows the first product to flow into mixing space 20 with a swirling effect.

In particular, this facilitates mixing in mixing chamber 14 by creating turbulence.

The distance along the direction of flow axis D between the first inlet 22 and the second inlet 24 is less than or equal to 15.0 mm, preferably 13.0 mm, most preferably 12.0 mm.

In the illustrated example, the distance along the direction of flow axis D extending between first inlet 22 and second inlet 24 corresponds to the distance between second inlet 24 and a so-called upper end of first inlet 22 along the direction of flow axis D.

First supply 12 is adapted to generate a continuous first product flow to first inlet 22.

First supply conduit 34 has no valve, for example.

In a variant, first supply conduit 34 is provided with a valve configured to control first product flow at first inlet 22.

First supply 12 has, for example, no nozzle adapted to inject the first product from the first supply into the mixing chamber as a flat jet. More specifically, first supply 12 has no nozzle at all.

Second supply 14 opens into mixing chamber 16 at second inlet 24.

The second supply includes a second product source (not shown) and a second supply conduit 40.

Second supply conduit 40 is made of stainless steel, for example.

Second supply conduit 40 has an inner surface 41 delimiting the passage of the second product.

Second supply conduit 40 includes a second downstream portion 42 opening into mixing chamber 16, at second inlet 24 more specifically.

Second supply 14 is adapted so that the second product has a pressure, more specifically at second inlet 24, strictly higher than the pressure of the first product, more specifically at first inlet 22.

The pressure of the first product is between 1 bar, i.e. $1.10^5$ Pa, and 500 bar, i.e. $5.10^7$ Pa, for example.

The pressure of the second product is higher than the pressure of the first product by at least 1.0%, generally by at least 5.0%.

This value specifically depends on the viscosity of each of the products to be mixed.

This makes it possible to improve the specific homogenization of the mixture.

Nozzle 18 is arranged and adapted to inject the second product from second supply 14 into mixing chamber 16 as a flat jet.

The jet has a jet angle α, at the nozzle outlet, of between 50° and 80°.

Nozzle 18 is arranged to inject the second product about a central injection axis, the central injection axis being aligned or coincident with flow axis D.

The entire second product passes through nozzle 18 before reaching mixing chamber 16.

Nozzle 18 is made of molten carbide, for example, specifically tungsten, stainless steel 316 or ceramic.

Nozzle 18 is here arranged in second supply 14 near second inlet 24.

Nozzle 18 is housed in second supply conduit 40, more specifically in second downstream portion 42.

In the illustrated example, nozzle 18 is held in the second supply conduit 40 by a nozzle holder 43 described later.

Nozzle 18 has an outer shape having rotational symmetry about the central injection axis D.

Nozzle 18 has a downstream end 44 corresponding to the most downstream point of nozzle 18 when considering the flow of the second product.

Downstream end 44 is arranged here in proximity to second inlet 24.

Downstream end 44 and second inlet 24 are spaced at a distance strictly less than 5.0 mm, for example, preferably 3.0 mm, most preferably 2.0 mm.

Downstream end 44 is upstream of second inlet 24 by the distance, for example. The injection of the second product thus sends the second product into mixing chamber 16.

In a variant, downstream end 44 extends downstream of second inlet 24 into mixing chamber 16. Nozzle 18 thus protrudes slightly at downstream end 44 into the mixing chamber 16.

The distance e in the direction of flow axis D between first inlet 22 and downstream end 44 is less than or equal to 10.0 mm.

The distance in the direction of flow axis D between first inlet 22 and downstream end 44, in the illustrated example, corresponds to the distance between downstream end 44 and upper end of first inlet 22 along the direction of flow axis D.

Nozzle 18 extends between downstream end 44 and upstream end 46 along central injection axis D.

Nozzle 18 has an upstream face 48, housed in the second supply conduit, and a downstream face 50, opposite upstream face 48 and facing mixing chamber 16.

Upstream face 48 delimits upstream end 46.

Downstream face 50 delimits downstream end 44.

Upstream face 48 is substantially flat and is arranged substantially transversely to central injection axis D.

Downstream face 50 is dome-shaped, centered on central injection axis D and has at least one slot, a single slot 52 in the example shown, perpendicular to central injection axis D.

Slot 52 has lips 54 that form an angle between them, typically between 5° and 150°, preferably between 20° and 110°.

Nozzle 18 has an external shape including two cylindrical sections, a first cylindrical section 56 delimiting upstream face 48, and a second cylindrical section 58 ending in a dome delimiting downstream face 50.

Each cylindrical section has central injection axis D as its cylinder axis.

First cylindrical section 56 has a diameter strictly greater than the diameter of second cylindrical section 58.

Nozzle 18 then defines an outer shoulder 60 on its outer surface.

Shoulder 60 is circumferential.

Nozzle 18 defines at least one passage 64.

In the illustrated example, nozzle 18 defines a single passage 64.

In a variant, nozzle 18 delimits a plurality of passages, between two and ten passages for example.

Nozzle 18 delimits at least one ejection opening 62, in the illustrated example a single one, the or each ejection opening 62 opening into downstream face 50.

Nozzle 18 includes as many passage(s) 64 as slot(s) 52 and as many ejection opening(s) 62.

The or each ejection opening 62 forms a portion of passage 64 or a respective passage, more specifically the most downstream portion of the passage.

In the illustrated example, the or each passage 64 further includes an inlet cavity 66 in the nozzle, followed by a channel 68.

More specifically, the or each passage 64 includes inlet cavity 66, channel 68, and ejection opening 62, from upstream to downstream.

Cavity 64 opens into upstream face 48.

Cavity 64 has a cross-sectional area that decreases downstream.

Inlet cavity 64 has rotational symmetry about central injection axis D, with the diameter of inlet cavity 64 decreasing from upstream end 46 or upstream face 48 of nozzle 18 to channel 66.

In the illustrated example, cavity 64 is bell-shaped.

Channel 66 has a constant cross-sectional area.

Channel 66 has a cylindrical shape, with central injection axis D as the cylinder axis.

Channel 66 extends in continuity with inlet cavity 64.

Ejection opening 62 includes, more specifically is formed by a narrowing 70 of the passage and slot 52 or a respective slot, from upstream to downstream.

Narrowing 70 forms a narrowing of channel 68 at a downstream end of channel 68.

Constriction 70 forms a circular passageway section.

Constriction 70 has a dome shape, split by slot 52, for example.

Slot 52 is of increasing dimension, from upstream to downstream.

Intersection 72 of slot 52 and constriction 70 forms an ellipse.

The ellipse has an equivalent diameter of 0.3 mm and 2.0 mm; i.e., it has an area equal to the area of a circle having the equivalent diameter.

Nozzle holder 43 is adapted to carry nozzle 18 and to hold it integral with second supply conduit 40.

Nozzle holder 43 is made of stainless steel, for example.

Nozzle holder 43 has rotational symmetry here, about central injection axis D.

Nozzle holder 43 includes an outer surface 74, adapted to interact with inner surface 41 of second supply conduit 40.

Inner surface 41 of second supply conduit 40 has an internal thread, for example, and outer surface 74 has a thread complementary to the internal thread.

In a variant, nozzle holder 43 is shrunk into second supply conduit 40 under heat, for example, so that outer surface 74 extends against inner surface 41 of second supply conduit 40.

Nozzle holder 43 has an upstream face 76 and a downstream face 78 along central injection axis D.

Nozzle holder 43 further delimits a housing 80 provided to receive nozzle 18, more specifically in a downstream portion of nozzle holder 43.

Housing 80 is a through hole along central injection axis D, for example.

The through hole is delimited by an inner surface 81 of nozzle holder 43.

The through hole opens into upstream face 76 on the one hand, and into downstream face 78 on the other hand.

The cross-section of the through hole decreases from upstream to downstream.

The through hole has a shoulder 82.

Shoulder 82 is formed by a narrowing of the through hole from upstream to downstream.

Shoulder 60 of nozzle 18 interacts with shoulder 82 of nozzle holder 43.

A seal 84 is arranged, between shoulder 60 of nozzle 18 and shoulder 82 of nozzle holder 43.

Seal 84 is made of polytetrafluoroethylene (PTFE), for example.

In a variant, seal 84 is replaced by adhesive.

Shoulder 82 of nozzle holder 43 forms a stop for nozzle 18 along central injection axis D in the upstream to downstream direction.

Nozzle 18 is further held along central injection axis D, in the downstream to upstream direction, by a second stop system.

The through hole delimits a complementary tool cavity 85, such as a hexagonal cross-section cavity, in an upstream portion.

This specifically allows a tool to be used to secure nozzle holder 43 in second supply conduit 40, by screwing nozzle holder 43 with the tool into second supply conduit 40, for example.

A seal 86 is further arranged between nozzle holder 43 and inner surface 41 of second supply conduit 40.

Seal 86 is made of PTFE, for example.

Nozzle 18 is received in nozzle holder 43, such that downstream end 44, more specifically the entire downstream face 50 of nozzle 18 protrudes from nozzle holder 43 at downstream face 78.

The second supply 14 further includes an injection valve 88.

Injection valve 88 is adapted to allow the second product to pass through it selectively.

Injection valve 88 is arranged in the second supply, more specifically in second supply conduit 40, upstream of nozzle 18.

Injection valve 88 includes a system, including an element 90 movable in relation to a base 92, designed to allow passage of the second liquid when the element is moved away from the base, and to prevent passage of the second liquid when the element extends against the base.

Base 92 defines a passage 95 having a decreasing cross-section from upstream to downstream.

The passage has a frustoconical shape, for example.

The second supply is such that the second product of the second supply necessarily passes through passage 95 delimited by base 92 before reaching nozzle 18 and/or mixing chamber 16.

Base 92 is fixed with respect to nozzle 18 here.

More specifically, base 92 is here integral with nozzle holder 43, via a holding element 96, for example.

Holding element 96 has an outer surface 98 provided to interact with inner surface 81 of the nozzle holder.

Outer surface 98 has an internal thread, for example, complementary to a thread of inner surface 81 of nozzle holder 43.

Holding element 96 further has a shoulder 100 capable of holding the base along the central injection axis in the downstream to upstream direction.

In the illustrated example, holding element 96 has an indentation 102 complementary to a tool.

Indentation 102 corresponds to a slot perpendicular to the central injection axis, for example. Indentation 102 is complementary to a screwdriver, for example.

This specifically allows a tool to be used for the installation of holding element 96 in nozzle holder 43.

Base 92 rests downstream on nozzle 18.

Thus, base 92 forms the second abutment system of nozzle 18 along central injection axis D, while nozzle 18 forms an abutment system of base 92 along the central injection axis for the upstream-downstream direction.

A seal 104 is arranged between base 92 and nozzle 18.

Seal 104 is made of PTFE, for example.

Thus, nozzle 18, seal 104 and base 92 are held fixed with respect to nozzle holder 43 along central injection axis D by shoulder 60 on the one hand, and by the holding element integral with nozzle holder 43 on the other hand.

In a variant, base 92 is fixed directly to nozzle holder 43.

Movable element 90 is controllable to selectively open or close passage 95 through the base.

More specifically, element 90 includes a ball 106 carried at one end of a needle 108.

Ball 106 is sized so that it closes passage 95 when resting on the edges of passage 95.

Thus, injection valve 88 controls passage of the second product through second supply conduit 40, to nozzle 18, and thus injected into mixing chamber 16.

Base 92 and displaceable element 90 are made of stainless steel, for example.

In the illustrated example, device 10 further includes an air supply 110, mixing chamber 16 further having an air inlet 112.

Air supply 110 opens into mixing chamber 16 at air inlet 112.

Air inlet 112 is arranged in side wall 32 of mixing chamber 16.

Air inlet 112 is arranged downstream of first inlet 22 of the first product along flow direction D.

The air is injected radially into mixing chamber 16.

This specifically creates additional turbulence, to promote mixing.

In an example not shown, the device does not include a nozzle holder, with the nozzle attached directly to the inner surface of the second supply duct. The base, if any, is then also attached directly to the inner surface of the second supply conduit, for example.

In a variant not shown, the device includes more than two product inlets into the mixing chamber, so as to mix more than two products in the mixing chamber. At least one of the inlets is arranged a nozzle as described above. More specifically, at all but one of the inlets is arranged a respective nozzle.

In another variant not shown, the device includes a second mixing chamber similarly including a first product inlet and a second product inlet. The second mixing chamber is arranged downstream of the previously described mixing chamber, with the outlet of the mixing chamber described forming the supply connected to the first inlet of the second mixing chamber, a supply of a third product being connected to the second inlet of the second mixing chamber. This then allows three products to be mixed in succession.

The device may thus include as many mixing chambers arranged in series as desired, the outlet of each mixing chamber outside the last being connected to the first inlet of the next mixing chamber.

Generally, when mixing a given number n of products, the device here includes n−1 nozzles, with each product inlet provided with a nozzle except for an inlet for a product called the mixing base.

A method for assembling the device 10 as described with respect to the Figures will now be described.

The method may be adapted, to allow assembly of the described variants of the device not shown.

A device including a first supply 12, a second supply 14 and a mixing chamber 16 is provided, as previously described.

A nozzle 18 is provided at second supply 14, as described, so as to inject the second product from the second supply into the mixing chamber as a flat jet.

More specifically, nozzle 18 is positioned in nozzle holder 43, in the through hole, more specifically so that shoulder 60 of nozzle 18 rests on shoulder 82 of nozzle holder 43.

A seal 84, annular, for example, is advantageously placed between shoulders 60, 82.

A seal 104, annular, is then placed on nozzle 18, for example.

Base 92 is then placed as described above.

Then, holding element 96 is inserted into nozzle holder 43, so as to remain integral with nozzle holder 43. The retaining element 96 is screwed into nozzle holder 43, for example, with a screwdriver, for example.

The assembly formed here of nozzle 18, base 92, holding element 96 and, if necessary, the corresponding seals, is integral with nozzle holder 43 in the through hole.

A seal 86, annular, is arranged on an outer surface of nozzle holder 43 so as to extend between nozzle holder 43 and inner surface 41 of second supply conduit 40.

Nozzle holder 43 is then inserted into second supply conduit 40 and secured to second supply conduit 40, by screwing, for example, with an Allen wrench, for example or, in a variant, by shrinking.

Nozzle holder 43 is such that nozzle 18 injects the second product into the mixing chamber.

Displaceable element 90 is thereafter positioned, together with a displaceable member actuator, such that the member is displaceable between a sealing position in which it extends against base 92 and a passage position in which it extends away from base 92.

A method of mixing at least a first product and a second product will now be described.

A device 10 is provided, as previously described.

A first product is provided at first inlet 22 into mixing chamber 16 by first supply 12.

A second product is supplied from second supply 14.

The second product has a pressure strictly greater than that of the first product, specifically at least 1.0%, typically at least 5.0%, as previously described.

The second product is injected through nozzle 18 into mixing chamber 16 as a flat jet.

The jet has a jet angle a of between 50° and 80° at the nozzle outlet.

More specifically, in the example shown, element 90 is spaced from base 92 so as to allow passage of second product through valve 88.

The second product enters nozzle 18 and exits nozzle 18 at the ejection opening 62.

The second product is injected as a flat jet onto the first product injected into the mixing chamber.

This promotes mixing, as the second product and the first product form a larger contact area, as opposed to a bead.

This allows for better distribution of the second product in the first product. The first product and the second product are thus homogeneously mixed at the outlet of the mixing chamber.

Such a mixing device allows for mixing a base with a catalyst to form a coating product, for example, specifically in the field of painting.

The invention claimed is:

1. A multi-component mixing device comprising:

at least a first supply of a first product and a second supply of a second product;

a mixing chamber comprising a first inlet and a second inlet and a flow axis, said first supply opening into the mixing chamber at the first inlet and introducing the first product into the mixing chamber along a central supply axis, said second supply opening into the mixing chamber at the second inlet; and a nozzle in said second supply injecting the second product into the mixing chamber about a central injection axis which is parallel to the flow axis, from said second supply into said mixing chamber as a flat jet, the nozzle comprising a downstream end, the distance in the direction of a flow axis between the first inlet and the downstream end being less than 10 mm, wherein the central supply axis and the central injection axis define respective lines that do not intersect.

2. The mixing device according to claim 1, wherein the flat jet has a jet angle of between 50° and 80°.

3. The mixing device according to claim 1, wherein said nozzle comprises a downstream end arranged in the vicinity of said second inlet.

4. The mixing device according to claim 3, wherein said downstream end of said nozzle is arranged at a distance strictly less than 5mm from said second inlet.

5. The mixing device according to claim 1, wherein said second supply is adapted so that the second product has a pressure strictly higher than the pressure of the first product.

6. The mixing device according to claim 5, wherein said second supply is adapted so that the second product has a pressure higher than the pressure of the first product of at least 1%.

7. The mixing device according to claim 1, wherein said nozzle delimits at least one passage, the at least one passage comprising an ejection opening comprising, from upstream to downstream, a circular passage section directly followed by a slot, the circular passage section and the slot having an intersection forming an ellipse.

8. The mixing device of claim 1, wherein the central injection axis is aligned with the flow axis.

9. The mixing device according to claim 1, wherein the central supply axis and the flow axis define an angle between 0° and 135°.

10. The mixing device according to claim 9, wherein the angle defined by the central supply axis and the flow axis is between 0° and 90°.

11. The mixing device according to claim 1, wherein the central supply axis and the flow axis define respective lines that do not intersect.

12. The mixing device according to claim 11, wherein the distance between the lines defined by the central supply axis and the flow axis is between 0.03r, where r denotes a value of the mixing chamber radius.

13. The mixing device according to claim 1, further comprising an air supply, said mixing chamber having an air inlet, the air supply opening into said mixing chamber at the air inlet.

14. A method for mixing at least a first product and a second product, comprising the following steps:

providing a mixing device according to claim 1;

supplying the first product at the first inlet of the mixing device;

supplying the second product at the second inlet of the mixing device; and injecting the second product into the first product in the mixing chamber of the mixing device through the nozzle of the mixing device, as a flat jet.

* * * * *